(12) United States Patent
Aschner et al.

(10) Patent No.: US 10,997,240 B1
(45) Date of Patent: May 4, 2021

(54) DYNAMICALLY DETERMINING HIGHLIGHTS OF MEDIA CONTENT BASED ON USER INTERACTION METRICS AND/OR SOCIAL MEDIA METRIC

(71) Applicant: Amazon Technologies, Inc., Seattle, WA (US)

(72) Inventors: Eric B. Aschner, Round Rock, TX (US); Doug Kurtz, Sammamish, WA (US); Michael Vernon Lee, Cedar Park, TX (US); Mani Madhukar Bansal, Round Rock, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/291,868

(22) Filed: Mar. 4, 2019

(51) Int. Cl.
| | |
|---|---|
| *G06F 16/73* | (2019.01) |
| *G06F 16/738* | (2019.01) |
| *H04L 29/08* | (2006.01) |
| *H04N 21/845* | (2011.01) |
| *G06F 16/908* | (2019.01) |
| *G06F 16/9536* | (2019.01) |
| *G06Q 50/00* | (2012.01) |

(52) U.S. Cl.
CPC ......... *G06F 16/739* (2019.01); *G06F 16/908* (2019.01); *G06F 16/9536* (2019.01); *H04L 67/22* (2013.01); *H04N 21/8456* (2013.01); *G06Q 50/01* (2013.01)

(58) Field of Classification Search
CPC .......................... G06F 16/739; H04N 21/8456
See application file for complete search history.

(56) References Cited

U.S. PATENT DOCUMENTS

| | | | | |
|---|---|---|---|---|
| 2014/0067834 | A1* | 3/2014 | Hutten | G06Q 30/02 707/754 |
| 2018/0025078 | A1* | 1/2018 | Quennesson | G06F 16/00 725/141 |
| 2019/0289372 | A1* | 9/2019 | Merler | G06N 3/04 |

* cited by examiner

*Primary Examiner* — Girumsew Wendmagegn
(74) *Attorney, Agent, or Firm* — Eversheds Sutherland (US) LLP

(57) ABSTRACT

Systems, methods, and computer-readable media are disclosed for dynamically determining highlights of media content based on user interaction metrics and/or social media metrics. In one embodiment, an example method may include determining media content streamed to user devices over a time period and corresponding to a live event, determining user interaction data associated with the media content and indicative of user interactions with the user devices, determining, using the user interaction data, a quality score for a time interval during the time period, the quality score indicative of user engagement in a segment of the media content, determining, using the time interval and segment-by-segment metadata, a stream start time and a stream end time for the segment, generating, using the stream start time and the stream end time, a clip of the segment, and determining, using the quality score, that the clip is to be included in a highlight.

20 Claims, 6 Drawing Sheets

DYNAMICALLY DETERMINING HIGHLIGHTS OF MEDIA CONTENT BASED ON USER INTERACTION METRICS AND/OR SOCIAL MEDIA METRIC

BACKGROUND

Media content, such as video content or audio content, may be presented at electronic user devices such that users can consume or interact with the content. In many instances, media content corresponding to a live event may be streamed to user devices in real time or close to real time as may occur due to slight delays in delivery of the content to the user devices. For example, media content for a live sporting event may be streamed to user devices such that users may watch and/or listen to the event or commentary on the event in real time or close to real time. In some instances, certain entities, such as content providers, content publishers, or third parties, may create highlight replays of media content to allow to users to watch and/or listen to certain segments of the media content. For example, in the sporting event context, a highlight reel may be generated, which may include segments covering certain plays or other actions that occurred during the live event. Existing techniques for creating highlight replays may rely on static metrics and/or manual selection of segments of media content to be included in a replay. For example, a highlight reel for a sporting event may include only segments covering scoring plays or other types of plays that satisfy a static metric or may include only segments deemed significant by a human operator. As a result, such techniques may fail to include certain segments of the media content that may be of particular interest to users desiring to watch highlights of the live event and may require significant human resources in generating the highlight replay.

Figure 1A:
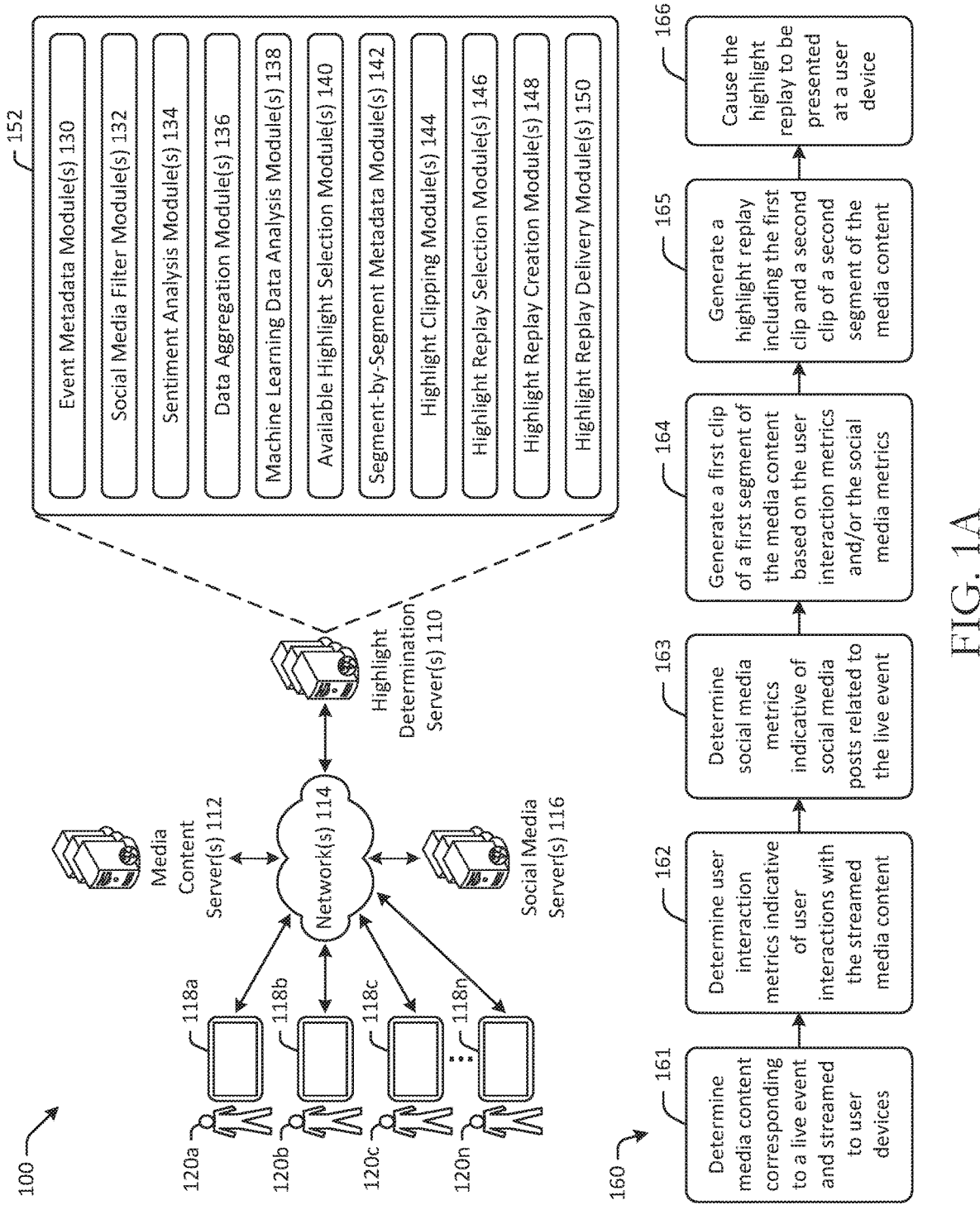
FIG. 1A is a hybrid system and process diagram illustrating dynamically determining highlights of media content based on user interaction metrics and/or social media metrics in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

A variety of media content may be presented at electronic user devices such that users may consume or interact with the content. For example, sporting events, television shows, movies, music, music videos, of other types of media content may be presented at user devices and consumed by users. Media content for presentation at user devices may include video content for visual consumption, audio content for auditory consumption, a combination of video content and audio content, or other types of content that may be consumed by users. In some instances, media content may be streamed to electronic user devices, which may include televisions, set-top boxes, computing devices, mobile phones, gaming consoles, external computing devices coupled to a television, or any other type of electronic device that allows users to receive and consume the media content. Media content corresponding to a live event often may be streamed to user devices in real time or close to real time as may be experienced due to slight delays in delivery of the media content to the user devices. For example, media content for a live sporting event, such as a football game, may be streamed to user devices such that users may watch and/or listen to the event or commentary on the event in real time or close to real time. As another example, media content for a live awards ceremony, such as a music awards ceremony, similarly may be streamed to user devices such that users may watch and/or listen to the event or commentary on the event in real time or close to real time.

In many instances, certain entities, such as content providers, content publishers, or third parties, may create highlight replays of media content corresponding to a live event. Such highlight replays may allow users to watch and/or listen to certain segments of the media content after the live event has ended. For example, highlight replays may be beneficial for users who were unable to consume the media content at the time of the live event, users who were unable to consume the media content in its entirety, and users who do not wish to wish to consume a replay of the entire media content. In the context of a live sporting event, an entity may generate a highlight reel that includes segments of the media content that cover certain plays or other actions that occurred during the live event. In the context of a live awards ceremony, an entity may generate a highlight replay that includes segments of the media content that covers the announcement of certain awards, acceptance speeches for certain awards, or other actions that occurred during the live event. Existing techniques for creating highlight replays often may rely on static metrics or criteria and/or manual selection of segments of media content to be included in a replay. For example, a highlight reel for a football game may include only segments covering scoring plays, turnover plays, plays for a yardage gain that exceeds a certain threshold, or other types of plays that satisfy a static metric or criterion or may include only segments deemed significant by a human operator. For a music awards ceremony, a highlight replay may include only segments covering the announcement of major awards, the acceptance of major awards, the performance of new songs, or other types of actions that satisfy a static metric or criterion or may include only segments deemed significant by a human operator. As a result, existing techniques for highlight generation may fail to include certain segments of the media content that may be of particular interest to users desiring to watch highlights of the live event and/or may require significant human resources in generating the highlight replay.

In order to provide highlight replays of media content for live events which include segments that may be of greatest interest to users and to reduce the need for human resources, content providers, content publishers, and/or other third parties may desire to implement alternative techniques for generating media content highlights.

Embodiments of the disclosure may provide improved techniques for dynamically generating highlight replays of media content corresponding to a live event. Certain embodiments may receive media content corresponding to a live event from a content server. The media content may include video content, audio content, or a combination of video and audio content. Some embodiments may cause the media content to be streamed to a plurality of user devices over a time period. For example, the media content may be streamed to the user devices in real time or close to real time with respect to the live event. Certain embodiments may determine user interaction metrics associated with the streamed media content. For example, the user interaction metrics may be determined based at least in part on user interaction data received from the plurality of user devices. The user interaction metrics may be indicative of user interactions with the plurality of user devices during the time period. For example, the user interaction metrics may include a rewind metric indicative of a rate of user selection of a rewind function, a skip-back metric indicative of a rate of user selection of a skip-back function, a volume-up metric indicative of a rate of user selection of a volume-up function, and/or other types of metrics related to user interactions with the streamed media content. Some embodiments may determine social media metrics associated with the live event. For example, the social media metrics may be determined based at least in part on social media data collected from one or more social media platforms. The social media metrics may be indicative of social media posts related to the live event and posted during the time period. For example, the social media metrics may include a participant metric indicative of a rate of social media mentions related to a participant in the live event, a participant group metric indicative of a rate of social media mentions related to a group of participants in the live event, an event metric indicative of a rate of social media mentions related to the live event, and/or other types of metrics related to social media posts related to the live event. Certain embodiments may determine first global engagement metrics for a first time interval during the time period. The first global engagement metrics may be based at least in part on the user interaction metrics and the social media metrics. For example, the first global engagement metrics may include one or more of the user interaction metrics for the first time period and one or more of the social media metrics for the first time period. Some embodiments may determine a first quality score for the first time interval, with the first quality score being indicative of user engagement in a first segment of the media content. The first quality score may be based at least in part on the first global engagement metrics. For example, the first quality score may be determined using one or more machine learning algorithms that receive the first global engagement metrics as input and output the first quality score. Certain embodiments may determine a first stream start time corresponding to a beginning of the first segment and a first stream end time corresponding to an end of the first segment. The first stream start time and the first stream end time may be determined based at least in part on the first time interval and segment-by-segment metadata for the media content. For example, the segment-by-segment metadata may be used to determine that the first time interval corresponds to the first segment, and the segment-by-segment metadata may include the first stream start time and the first stream end time for the first segment. Some embodiments may generate a first clip of the first segment based at least in part on the first stream start time and the first stream end time. For example, the first clip may be generated from the media content by clipping the first segment from the media content, using the first stream start time to identify the beginning of the clip and the first stream end time to identify the end of the clip. Certain embodiments may generate a highlight replay for the media content, with the highlight replay including the first clip and a second clip of a second segment of the media content. For example, the first clip and the second clip may be selected for inclusion in the highlight replay based on one or more metrics or characteristics associated with the respective clips, and the first clip and the second clip may be combined to form the highlight replay. Some embodiments may cause the highlight replay to be presented at a user device. For example, the highlight replay may be caused to be presented at the user device in response to receiving a request for the highlight replay from the user device. As a result, embodiments of the disclosure may provide a highlight replay of media content for a live event which includes segments of the media content that may be of greatest interest to users, while also reducing the need for human resources in generating the highlight replay.

Certain embodiments may determine media content streamed to a plurality of user devices over a time period, the media content corresponding to a live event. For example, the media content corresponding to the live event may be received from a content server. The media content may include video content, audio content, or a combination of video and audio content, and the media content may be streamed to the user devices in real time or close to real time with respect to the live event. Some embodiments may determine user interaction data associated with the streamed media content, the user interaction data being indicative of user interactions with the plurality of user devices during the time period. For example, the user interaction data may be indicative of user selection of a rewind function, a skip-back function, a volume-up function, and/or other types of user interactions with the streamed media content. Certain embodiments may determine a first quality score for a first time interval during the time period based at least in part on the user interaction data. The first quality score may be determined based at least in part on the user interaction data and may be indicative of user engagement in a first segment of the media content. For example, the user interaction data may be used to determine one or more user interaction metrics associated with the first segment, and the one or more user interaction metrics may be used to determine the first quality score. Some embodiments may determine a first stream start time corresponding to a beginning of the first segment and a first stream end time corresponding to an end of the first segment. The first stream start time and the first stream end time may be determined based at least in part on the first time interval and segment-by-segment metadata for the media content. For example, the segment-by-segment metadata may be used to determine that the first time interval corresponds to the first segment, and the segment-by-segment metadata may include the first stream start time and the first stream end time for the first segment. Certain embodiments may generate a first clip of the first segment based at least in part on the first stream start time and the first stream end time. For example, the first clip may be generated from the media content by clipping the first segment from the media content, using the first stream start time to identify the beginning of the clip and the first stream end time to identify the end of the clip. Some embodiments may determine that the first clip is to be included in highlight content for the media content based at least in part on the first quality score. For example, it may be determined that the first quality score is greater than a threshold value, and the first clip may be included in the highlight content based on that determination.

Certain embodiments may determine media content streamed to a plurality of user devices over a time period, the media content corresponding to a live event. For example, the media content corresponding to the live event may be received from a content server. The media content may include video content, audio content, or a combination of video and audio content, and the media content may be streamed to the user devices in real time or close to real time with respect to the live event. Some embodiments may determine social media data associated with the live event, the social media data being indicative of social media posts related to the live event and posted during the time period. For example, the social media data may be indicative of social media mentions related to a participant in the live event, a group of participants in the live event, the live event itself, and/or other aspects or characteristics of the live event mentioned in the social media posts. Certain embodiments may determine a first quality score for a first time interval during the time period based at least in part on the social media data. The first quality score may be determined based at least in part on the social media data and may be indicative of user engagement in a first segment of the media content. For example, the social media data may be used to determine one or more social media metrics associated with the first time interval, and the one or more social media metrics may be used to determine the first quality score. Some embodiments may determine a first stream start time corresponding to a beginning of the first segment and a first stream end time corresponding to an end of the first segment. The first stream start time and the first stream end time may be determined based at least in part on the first time interval and segment-by-segment metadata for the media content. For example, the segment-by-segment metadata may be used to determine that the first time interval corresponds to the first segment, and the segment-by-segment metadata may include the first stream start time and the first stream end time for the first segment. Certain embodiments may generate a first clip of the first segment based at least in part on the first stream start time and the first stream end time. For example, the first clip may be generated from the media content by clipping the first segment from the media content, using the first stream start time to identify the beginning of the clip and the first stream end time to identify the end of the clip. Some embodiments may determine that the first clip is to be included in highlight content for the media content based at least in part on the first quality score. For example, it may be determined that the first quality score is greater than a threshold value, and the first clip may be included in the highlight content based on that determination.

Referring to FIG. 1A, an example system 100 illustrating dynamically determining highlights of media content based on user interaction metrics and/or social media metrics is depicted in accordance with one or more example embodiments of the disclosure. The system 100 may include one or more servers and at least one or a plurality of user devices that connects to the server. In the example of FIG. 1A, one or more highlight determination server(s) 110 may be used to automatically generate or otherwise determine highlight content of media content based at least in part on user interaction data obtained from user devices and/or social media data obtained from one or more social media platforms. The highlight determination server 110 may be in communication with one or more user device(s) 118. Communication between the highlight determination server 110 and the one or more user devices 118 may be facilitated by one or more network(s) 114. The one or more user devices 118 may connect to or communicate with the highlight determination server 110, on a regular or irregular basis, to receive content from or deliver content to the highlight determination server 110. In the example of FIG. 1A, one or more media content server(s) 112 also may be in communication with highlight determination server 110 and the one or more user devices 118. Communication between the media content server 112 and the highlight determination server 110 may be facilitated by the one or more networks 114. The one or more user devices 118 may connect to or communicate with the media content server 112, on a regular or irregular basis, to receive content from or deliver content to the media content server 112. In the example of FIG. 1A, one or more social media server(s) 116 also may be in communication with highlight determination server 110 and the one or more user devices 118. Communication between the social media server 116 and the highlight determination server 110 may be facilitated by the one or more networks 114. The one or more user devices 118 may connect to or communicate with the social media server 116, on a regular or irregular basis, to receive content from or deliver content to the social media server 116.

The one or more user devices 118 may be any type of electronic device used by a user to communicate with the highlight determination server 110, the media content server 112, and the social media server 116. In some embodiments, the user devices 118 may be one or more of a television, a set-top box, a computing device, a mobile phone, a gaming console, an external computing device coupled to a television, or any other type of electronic device that allows users to receive and consume media content. The highlight determination server 110 may be in communication with any number of user devices 118. In the example of FIG. 1A, the highlight determination server 110, the media content server 112, and the social media server 116 may be in communication with a first user device 118a associated with a first user 120a, a second user device 118b associated with a second user 120b, and a third user device 118c associated with a third user 120c.

In the example of FIG. 1A, the highlight determination server 110 may receive media content from the media content server 112. The media content may correspond to a live event, such as a live sporting event or a live awards ceremony. The media content may include video content, audio content, or a combination of video and audio content. The media content may be streamed to the user devices 118 over a time period. For example, the media content may be streamed to the user devices 118 in real time or close to real time with respect to the live event. In some embodiments, the media content server 112 may cause the media content to be streamed to the user devices 118. In some embodiments, the highlight determination server 110 may cause the media content to be streamed to the user devices 118. During the time period, the highlight determination server 110 may determine user interaction data associated with the streamed media content. The user interaction data may be indicative of user interactions with the user devices 118 performed by the users 120. For example, the user interaction data may be indicative of user selection of a rewind function, a skip-back function, a volume-up function, and/or other types of user interactions with the streamed media content. In some embodiments, the user interaction data may be received or otherwise obtained from the user devices 118. During the time period, the highlight determination server 110 also may determine social media data associated with the live event. The social media data may be indicative of social media posts related to the live event and posted during the time period via one or more social media platforms. For example, the social media data may be indicative of social media mentions related to a participant in the live event, a group of participants in the live event, the live event itself, and/or other aspects or characteristics of the live event mentioned in the social media posts. In some embodiments, the social media data may be received or otherwise obtained from the social media servers 116. As described below, the highlight determination server 110 may use the user interaction data and/or the social media data in determining highlight replay content for the media content.

Figure 1B:
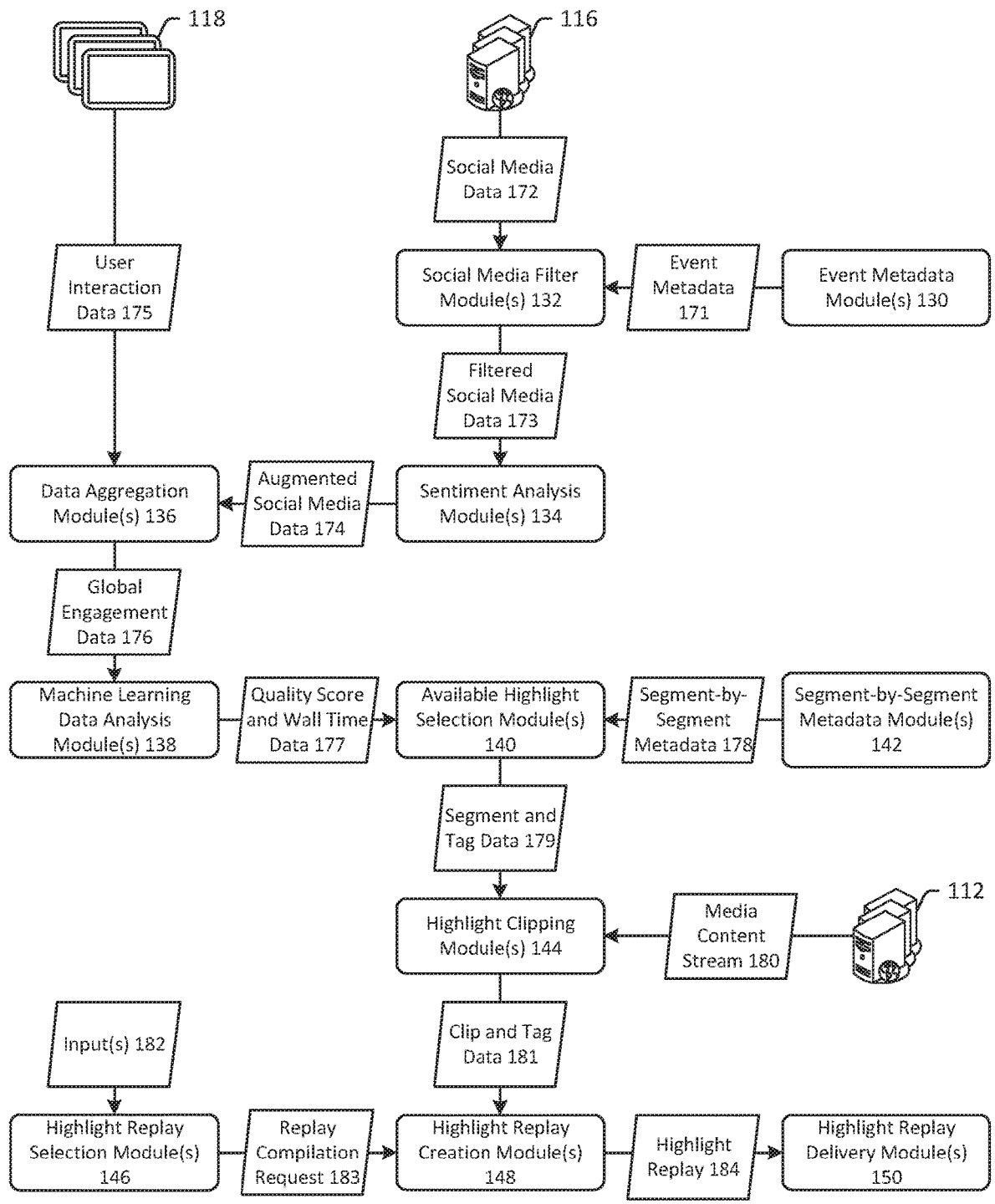
FIG. 1B is a data flow diagram illustrating dynamically determining highlights of media content based on user interaction metrics and/or social media metrics in accordance with one or more embodiments of the disclosure.

The highlight determination server 110 may include one or more modules configured to determine highlight replay content based at least in part on the user interaction data and/or the social media data. In the example of FIG. 1A, the highlight determination server 110 may include one or more event metadata module(s) 130, one or more social media filter module(s) 132, one or more sentiment analysis module(s) 134, one or more data aggregation module(s) 136, one or more machine learning data analysis module(s) 138, one or more available highlight selection module(s) 140, one or more segment-by-segment metadata module(s) 142, one or more highlight clipping module(s) 144, one or more highlight replay selection module(s) 146, one or more highlight replay creation module(s) 148, and one or more highlight replay delivery module(s) 150. These modules 130, 132, 134, 136, 138, 140, 142, 144, 146, 148, 150 collectively may form a set of highlight determination modules 152. FIG. 1B depicts an example data flow for dynamically determining highlights of media content based on user interaction metrics and social media metrics in accordance with one or more embodiments of the disclosure. The respective functions of the highlight determination modules 152 are described below with reference to FIGS. 1A and 1B.

The event metadata module 130 may be configured to generate or otherwise determine event metadata 171 associated with the live event. The event metadata 171 may include participant metadata indicative of one or more participants in the live event. For example, for a live sporting event, the participant metadata may include the names, nicknames, or other name variants of players, teams, coaches, officials, or other participants in the sporting event. The event metadata 171 also may include event name metadata indicative of the live event itself and/or other metadata related to the live event. The event metadata 171 may be determined and provided to the social media filter module 132 prior to the live event.

The social media filter module 132 may be configured to receive the event metadata 171 and to generate one or more social media filters based at least in part on the event metadata 171. The social media filters may be generated prior to the live event and may include one or more terms from the event metadata 171, such as participant names, participant group names, event names, etc. During the time period in which the media content is streamed to the user devices 118, the social media filter module 132 may receive or otherwise determine social media data 172 posted during the time period via one or more social media platforms. For example, the social media filter module 132 may obtain the social media data 172 from the social media servers 116. The social media data 172 may include social media posts generated by one or more of the user devices 118 and/or other user devices that are not streaming the media content. The social media filter module 132 may use the one or more social media filters to determine filtered social media data 173 indicative of social media posts that are related to the live event. For example, the filtered social media 173 data may include all social media posts that mention one or more of the participant names, participant group names, or event names associated with the live event. The filtered social media data 173 may be determined and provided to the sentiment analysis module 134.

The sentiment analysis module 134 may be configured to receive the filtered social media data 173 and to determine a sentiment of each of the social media posts included in the filtered social media data 173. For example, the sentiment analysis module 134 may be configured to analyze the social media posts of the filtered social media data 173 and to assign a sentiment score to each social media post. In some embodiments, the sentiment score may be a textual value, such as "positive," "negative," or "neutral." In some embodiments, the sentiment score may be a numerical value, such as a number within a range of zero (0) to ten (10). The sentiment analysis module 134 may be configured to generate or otherwise determine augmented social media data 174 that includes the social media posts of the filtered social media data 173 and sentiment scores associated with each of the social media posts. The augmented social media data 174 may be determined and provided to the data aggregation module 136.

The data aggregation module 136 may be configured to receive the augmented social media data 174 and user interaction data 175. The user interaction data 175 may be received from the user devices 118 streaming the media content. The user interaction data 175 may be indicative of user interactions with the user devices 118 performed by the users 120 during the time period. For example, the user interaction data 175 may be indicative of user selection of a rewind function, a skip-back function, a volume-up function, and/or other types of user interactions with the streamed media content. The data aggregation module 136 may generate or otherwise determine global engagement data 176 based at least in part on the augmented social media data 174 and the user interaction data 175. The data aggregation module 136 may aggregate the augmented social media data 174 and the user interaction data 175 for respective time intervals during the time period. In some embodiments, each time interval may be one (1) second, thirty (30) seconds, one (1) minute, five (5) minutes, or another duration of time. For each time interval, the data aggregation module 136 may determine global engagement data 176 that includes a respective portions of the augmented social media data 174 and the user interaction data 175 corresponding to that time interval. For example, the data aggregation module 136 may determine first global engagement data 176 for a first time interval, second global engagement data 176 for a second time interval, and so forth. The global engagement data 176 for a particular time interval may include one or more user interaction metrics and one or more social media metrics. The one or more user interaction metrics may be determined based at least in part on the portion of the user interaction data 175 corresponding to the particular time interval. In some embodiments, the one or more user interaction metrics may include a rewind metric indicative of a rate of user selection of a rewind function, a skip-back metric indicative of a rate of user selection of a skip-back function, a volume-up metric indicative of a rate of user selection of a volume-up function, and/or other types of metrics related to user interactions with the streamed media content. The one or more social media metrics may be determined based at least in part on the portion of the augmented social media data 174 corresponding to the particular time interval. In some embodiments, the one or more social media metrics may include a participant metric indicative of a rate of social media mentions related to a participant in the live event, a participant group metric indicative of a rate of social media mentions related to a group of participants in the live event, an event metric indicative of a rate of social media mentions related to the live event, and/or other types of metrics related to social media posts related to the live event. The global engagement data 176 may be determined and provided to the machine learning data analysis module 138.

The machine learning data analysis module 138 may be configured to receive the global engagement data 176 and to determine a quality score for each time interval during the time period. The quality score for each time interval may be indicative of user engagement in a corresponding segment of the media content. The quality scores for the respective time intervals may be determined using one or more machine learning algorithms implemented by the machine learning data analysis module 138. The one or more machine learning algorithms of the machine learning data analysis module 138 may receive the global engagement data 176 for a particular time interval as input and output the quality score for that time interval. In some embodiments, the quality score may be a numerical value, such as a number within a range of zero (0) to one hundred (100). For each time interval, the machine learning data analysis module 138 may determine quality score and wall time data 177 that includes the quality score, a wall start time corresponding to a beginning of the time interval, and a wall end time corresponding to an end of the time interval. For example, the machine learning data analysis module 138 may determine first quality score and wall time data 177 for the first time interval, second quality score and wall time data 177 for the second time interval, and so forth. The quality score and wall time data 177 may be determined and provided to the available highlight selection module 140.

The available highlight selection module 140 may be configured to receive the quality score and wall time data 177 for a particular time interval and to determine the corresponding segment of the media content. The corresponding segment may be determined based at least in part on the particular time interval and segment-by-segment metadata 178 for the media content. The segment-by-segment metadata 178 may be generated or otherwise determined by the segment-by-segment metadata module 142. The segment-by-segment metadata 178 may include metadata associated with respective segments of the media content. In some embodiments, for each segment of the media content, the segment-by-segment metadata 178 may include event action metadata indicative of one or more actions that occurred in a portion of the live event corresponding to the segment, participant metadata indicative of one or more participants in the live event related to the one or more actions, event start time metadata corresponding to a beginning of the portion of the live event, event end time metadata corresponding to an end of the portion of the live event, and/or other metadata associated with the segment of the media content. In some embodiments, the segment-by-segment metadata 178 may be generated by the segment-by-segment metadata module 142. In some embodiments, the segment-by-segment metadata 178 may be received by the segment-by-segment metadata module 142 from a third party source. For a particular time interval, the available highlight selection module 140 may determine a stream start time corresponding to the beginning of the corresponding segment and a stream end time corresponding to an end of the corresponding segment. The stream start time and the stream end time may be determined based at least in part on the particular time interval and the segment-by-segment metadata 178. The available highlight selection module 140 may generate or otherwise determine segment and tag data 179 for each segment of the media content. For each segment, the segment and tag data 179 may include one or more tags for the segment. In some embodiments, the segment and tag data 179 may include the quality score, the event action metadata, the participant metadata, the stream start time, the stream end time, and/or other data associated with the particular segment. The segment and tag data 179 may be determined and provided to the highlight clipping module 144.

The highlight clipping module 144 may be configured to receive the segment and tag data 179 for segments of the media content and to generate content clips of the respective segments. For each segment, the content clip may be generated based at least in part on the stream start time for the segment, the stream end time for the segment, and a media content stream 180 of the media content. The media content stream 180 may be received from the media content server 112. For each segment, the corresponding clip may be generated from the media content stream 180 by clipping the segment from the media content stream 180, using the stream start time to identify the beginning of the clip and the stream end time to identify the end of the clip. The highlight clipping module 144 may generate or otherwise determine clip and tag data 181 for each clip. For each clip, the clip and tag data 181 may include the clip and one or more tags for the clip. In some embodiments, the clip and tag data 181 may include the quality score, the event action metadata, the participant metadata, and/or other data associated with the particular clip. The clip and tag data 181 may be determined and provided to the highlight replay creation module 148.

The highlight replay creation module 148 may be configured to receive the clip and tag data 181 for respective clips generated by the highlight clipping module 144 and to generate one or more highlight replays 184. The highlight replay 184 may be generated based at least in part on a replay compilation request 183 received from the highlight replay selection module 146. The highlight replay selection module 146 may generate the replay compilation request 183 based at least in part on one or more input(s) 182. In some embodiments, the one or more input(s) 182 may indicate one or more of a threshold quality score value for determining clips to be included in the highlight replay 184, a duration of the highlight replay 184, a particular participant to be featured in the highlight replay 184, a particular group of participants to be included in the highlight replay 184, and/or other criteria for determining clips to be included in the highlight replay 184. In some embodiments, the one or more input(s) 182 may be provided by a user requesting the highlight replay 184 or by a third party. The one or more highlight replays 184 may be determined and provided to the highlight replay delivery module 150. The highlight replay delivery module 150 may be configured to receive the one or more highlight replays 184 and deliver the one or more highlight replays 184 to user devices. In some embodiments, the one or more highlight replays 184 may be streamed to a user device in response to a request for the one or more highlight replays 184 from the user device. In some embodiments, the one or more highlight replays 184 may be provided to a user device as a video on demand.

To dynamically determine highlights of media content based on user interaction metrics and/or social media metrics, the highlight determination server 110 may execute one or more process flows. An example process flow 160 for dynamically determining highlights of media content based on user interaction metrics and/or social media metrics in accordance with one or more embodiments of the disclosure is depicted in FIG. 1. The highlight determination server 110 may include at least one memory that stores computer-executable instructions and at least one processor configured to access the at least one memory and execute the computer-executable instructions to perform various actions or operations, such as one or more of the operations of the process flow 160.

At block 161, the highlight determination server 110 may determine media content corresponding to a live event and streamed to user devices. At block 162, the highlight determination server 110 may determine user interaction metrics indicative of user interactions with the streamed media content. At block 163, the highlight determination server 110 may determine social media metrics indicative of social media posts related to the live event. At block 164, the highlight determination server 110 may generate a first clip of a first segment of the media content based at least in part on the user interaction metrics and/or the social media metrics. At block 165, the highlight determination server 110 may generate a highlight replay including the first clip and a second clip of a second segment of the media content. At block 166, the highlight determination server 110 may cause the highlight replay to be presented at a user device.

By implementing the process of determining media content corresponding to a live event and streamed to user devices, determining user interaction metrics indicative of user interactions with the streamed media content, determining social media metrics indicative of social media posts related to the live event, generating a first clip of a first segment of the media content based at least in part on the user interaction metrics and/or the social media metrics, generating a highlight replay including the first clip and a second clip of a second segment of the media content, and causing the highlight replay to be presented at a user device, embodiments of the disclosure may provide improved techniques for determining highlight replays of media content for live events which include segments that may be of greatest interest to users, while reducing the need for human resources.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

The above-described embodiments and additional and/or alternative embodiments of the disclosure will be described in detail hereinafter through reference to the accompanying drawings.

Illustrative Processes and Use Cases

Figure 2:
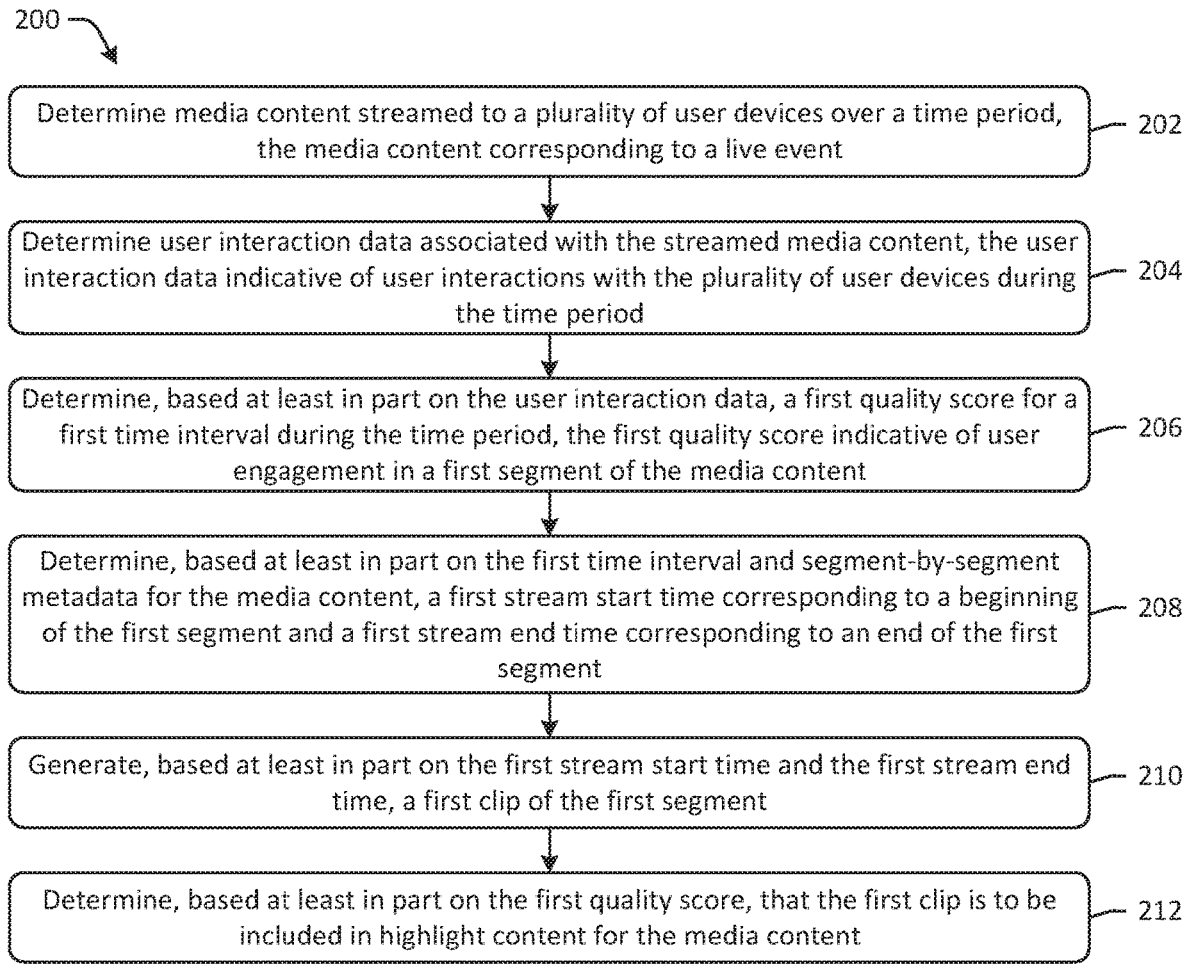
FIG. 2 is an example process flow diagram for dynamically determining highlights of media content based on user interaction metrics in accordance with one or more embodiments of the disclosure.

Referring to FIG. 2, an example process flow 200 for dynamically determining highlights of media content based on user interaction metrics in accordance with one or more embodiments of the disclosure is depicted. Although certain operations are illustrated as occurring separately in FIG. 2, some or all of the operations may occur concurrently or partially concurrently across one or more computer systems. In some embodiments, the operations of the process flow 200 may be executed by a remote server, such as a highlight determination server.

At block 202 of the process flow 200, media content streamed to a plurality of user devices over a time period may be determined. For example, computer-executable instructions of one or more module(s) stored at a highlight determination server may be executed to determine media content streamed to a plurality of devices. The media content may correspond to a live event, such as a live sporting event or a live awards ceremony, and the media content may be received from a content server. The media content may include video content, audio content, or a combination of video and audio content, and the media content may be streamed to the user devices in real time or close to real time with respect to the live event.

At block 204 of the process flow 200, user interaction data associated with the streamed media content may be determined. For example, computer-executable instructions of one or more module(s) stored at a highlight determination server may be executed to determine user interaction data associated with the streamed media content. The user interaction data may be indicative of user interactions with the plurality of user devices during the time period. For example, the user interaction data may be indicative of user selection of a rewind function, a skip-back function, a volume-up function, and/or other types of user interactions with the streamed media content.

At block 206 of the process flow 200, a first quality score for a first time interval during the time period may be determined. For example, computer-executable instructions of one or more module(s) stored at a highlight determination server may be executed to determine a first quality score for a first time interval during the time period. The first quality score may be determined based at least in part on the user interaction data and may be indicative of user engagement in a first segment of the media content. For example, the user interaction data may be used to determine one or more user interaction metrics associated with the first segment, and the one or more user interaction metrics may be used to determine the first quality score.

At block 208 of the process flow 200, a first stream start time corresponding to a beginning of the first segment and a first stream end time corresponding to an end of the first segment may be determined. For example, computer-executable instructions of one or more module(s) stored at a highlight determination server may be executed to determine a first stream start time corresponding to a beginning of the first segment and a first stream end time corresponding to an end of the first segment. The first stream start time and the first stream end time may be determined based at least in part on the first time interval and segment-by-segment metadata for the media content. For example, the segment-by-segment metadata may be used to determine that the first time interval corresponds to the first segment, and the segment-by-segment metadata may include the first stream start time and the first stream end time for the first segment.

At block 210 of the process flow 200, a first clip of the first segment may be generated. For example, computer-executable instructions of one or more module(s) stored at a highlight determination server may be executed to generate a first clip of the first segment. The first clip of the first segment may be generated based at least in part on the first stream start time and the first stream end time. For example, the first clip may be generated from the media content by clipping the first segment from the media content, using the first stream start time to identify the beginning of the clip and the first stream end time to identify the end of the clip.

At block 212 of the process flow 200, it may be determined that the first clip is to be included in highlight content for the media content. For example, computer-executable instructions of one or more module(s) stored at a highlight determination server may be executed to determine that the first clip is to be included in highlight content for the media content. In some embodiments, it may be determined that the first clip is to be included in highlight content for the media content based at least in part on the first quality score. For example, it may be determined that the first quality score is greater than a threshold value, and the first clip may be included in the highlight content based on that determination.

Figure 3:
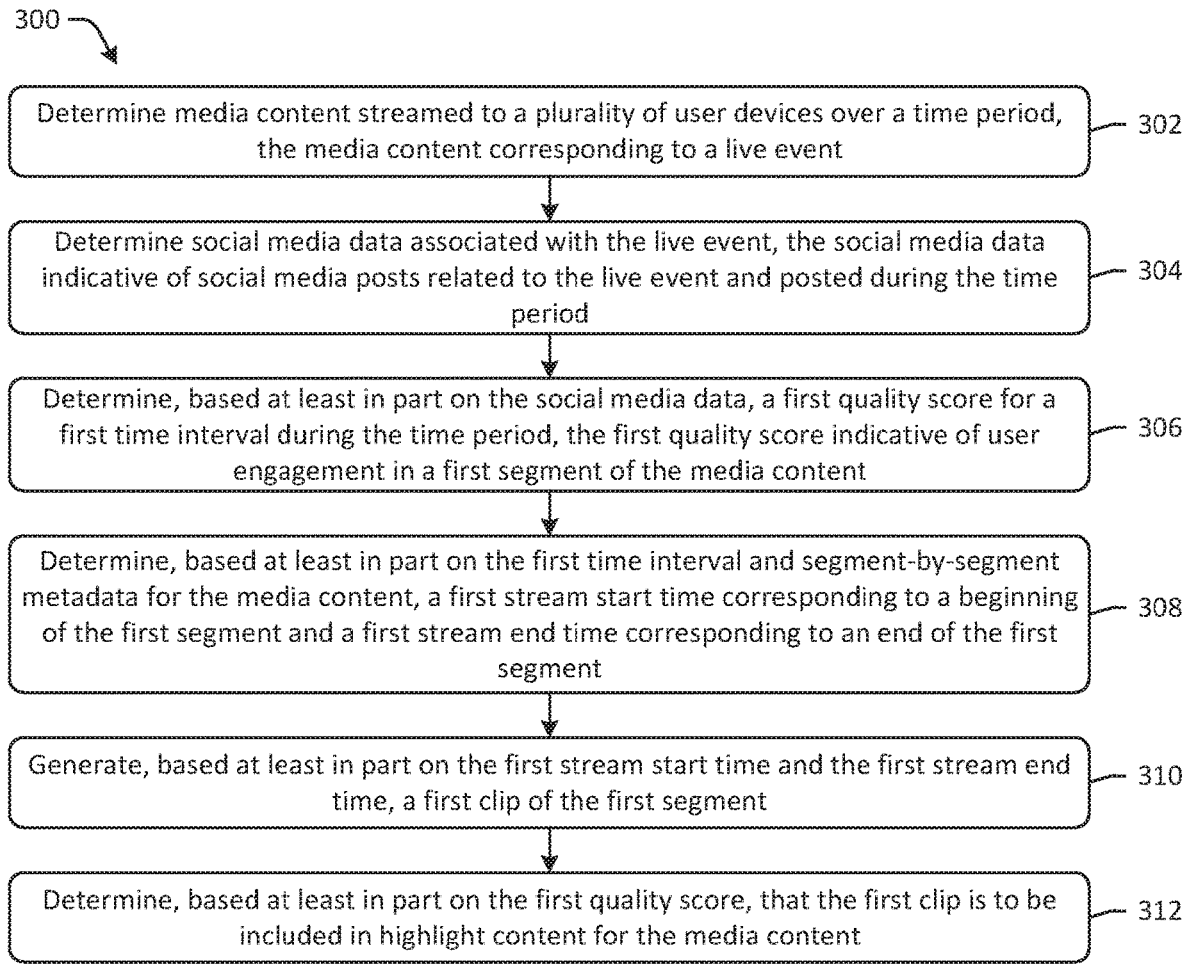
FIG. 3 is an example process flow diagram for dynamically determining highlights of media content based on social media metrics in accordance with one or more embodiments of the disclosure.

Referring to FIG. 3, an example process flow 300 for dynamically determining highlights of media content based on social media metrics in accordance with one or more embodiments of the disclosure is depicted. Although certain operations are illustrated as occurring separately in FIG. 3, some or all of the operations may occur concurrently or partially concurrently across one or more computer systems. In some embodiments, the operations of the process flow 300 may be executed by a remote server, such as a highlight determination server.

At block 302 of the process flow 300, media content streamed to a plurality of user devices over a time period may be determined. For example, computer-executable instructions of one or more module(s) stored at a highlight determination server may be executed to determine media content streamed to a plurality of devices. The media content may correspond to a live event, such as a live sporting event or a live awards ceremony, and the media content may be received from a content server. The media content may include video content, audio content, or a combination of video and audio content, and the media content may be streamed to the user devices in real time or close to real time with respect to the live event.

At block 304 of the process flow 300, social media data associated with the live event may be determined. For example, computer-executable instructions of one or more module(s) stored at a highlight determination server may be executed to determine social media data associated with the live event. The social media data may be indicative of social media posts related to the live event and posted during the time period. For example, the social media data may be indicative of social media mentions related to a participant in the live event, a group of participants in the live event, the live event itself, and/or other aspects or characteristics of the live event mentioned in the social media posts.

At block 306 of the process flow 300, a first quality score for a first time interval during the time period may be determined. For example, computer-executable instructions of one or more module(s) stored at a highlight determination server may be executed to determine a first quality score for a first time interval during the time period. The first quality score may be determined based at least in part on the social media data and may be indicative of user engagement in a first segment of the media content. For example, the social media data may be used to determine one or more social media metrics associated with the first time interval, and the one or more social media metrics may be used to determine the first quality score.

At block 308 of the process flow 300, a first stream start time corresponding to a beginning of the first segment and a first stream end time corresponding to an end of the first segment may be determined. For example, computer-executable instructions of one or more module(s) stored at a highlight determination server may be executed to determine a first stream start time corresponding to a beginning of the first segment and a first stream end time corresponding to an end of the first segment. The first stream start time and the first stream end time may be determined based at least in part on the first time interval and segment-by-segment metadata for the media content. For example, the segment-by-segment metadata may be used to determine that the first time interval corresponds to the first segment, and the segment-by-segment metadata may include the first stream start time and the first stream end time for the first segment.

At block 310 of the process flow 300, a first clip of the first segment may be generated. For example, computer-executable instructions of one or more module(s) stored at a highlight determination server may be executed to generate a first clip of the first segment. The first clip of the first segment may be generated based at least in part on the first stream start time and the first stream end time. For example, the first clip may be generated from the media content by clipping the first segment from the media content, using the first stream start time to identify the beginning of the clip and the first stream end time to identify the end of the clip.

At block 312 of the process flow 300, it may be determined that the first clip is to be included in highlight content for the media content. For example, computer-executable instructions of one or more module(s) stored at a highlight determination server may be executed to determine that the first clip is to be included in highlight content for the media content. In some embodiments, it may be determined that the first clip is to be included in highlight content for the media content based at least in part on the first quality score. For example, it may be determined that the first quality score is greater than a threshold value, and the first clip may be included in the highlight content based on that determination.

Figure 4:
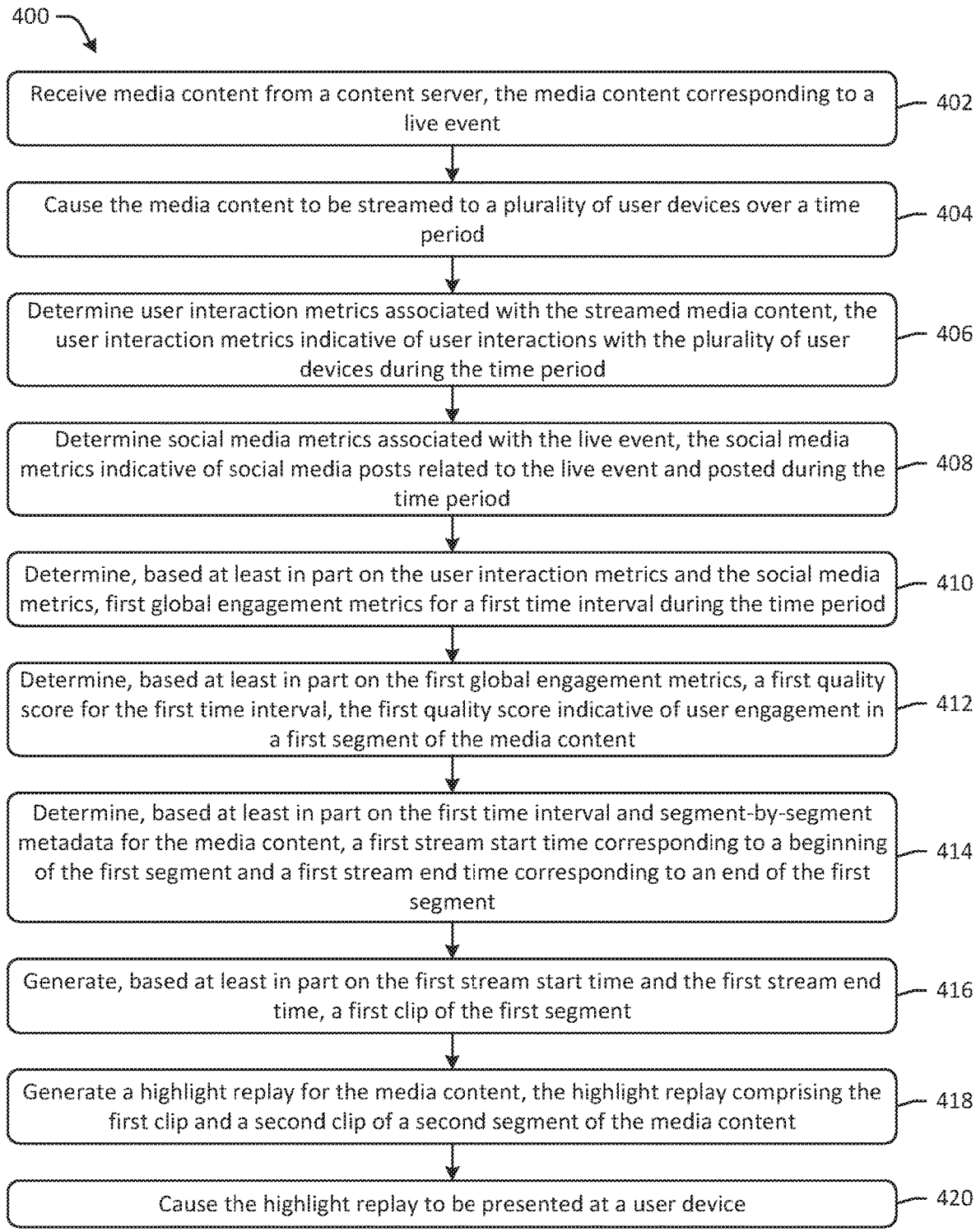
FIG. 4 is an example process flow diagram for dynamically determining highlights of media content based on user interaction metrics and social media metrics in accordance with one or more embodiments of the disclosure.

Referring to FIG. 4, an example process flow 400 for dynamically determining highlights of media content based on user interaction metrics and social media metrics in accordance with one or more embodiments of the disclosure is depicted. Although certain operations are illustrated as occurring separately in FIG. 4, some or all of the operations may occur concurrently or partially concurrently across one or more computer systems. In some embodiments, the operations of the process flow 400 may be executed by a remote server, such as a highlight determination server.

At block 402 of the process flow 400, media content corresponding to a live event may be received. For example, computer-executable instructions of one or more module(s) stored at a highlight determination server may be executed to receive media content corresponding to a live event. The media content corresponding to the live event from a content server. The media content may include video content, audio content, or a combination of video and audio content. The media content may correspond to a live event, such as a live sporting event or a live awards ceremony.

At block 404 of the process flow 400, the media content may be caused to be streamed to a plurality of user devices over a time period. For example, computer-executable instructions of one or more module(s) stored at a highlight determination server may be executed to cause the media content to be streamed to a plurality of user devices over a time period. In some embodiments, the media content may be caused to be streamed to the user devices in real time or close to real time with respect to the live event.

At block 406 of the process flow 400, user interaction metrics associated with the streamed media content may be determined. For example, computer-executable instructions of one or more module(s) stored at a highlight determination server may be executed to determine user interaction metrics associated with the streamed media content. The user interaction metrics may be indicative of user interactions with the plurality of user devices during the time period. For example, the user interaction metrics may include a rewind metric indicative of a rate of user selection of a rewind function, a skip-back metric indicative of a rate of user selection of a skip-back function, a volume-up metric indicative of a rate of user selection of a volume-up function, and/or other types of metrics related to user interactions with the streamed media content. In some embodiments, the user interaction metrics may be determined based at least in part on user interaction data received from the plurality of user devices. The user interaction data may be indicative of user selection of a rewind function, a skip-back function, a volume-up function, and/or other types of user interactions with the streamed media content.

At block 408 of the process flow 400, social media metrics associated with the live event may be determined. For example, computer-executable instructions of one or more module(s) stored at a highlight determination server may be executed to determine social media metrics associated with the live event. The social media metrics may be indicative of social media posts related to the live event and posted during the time period. For example, the social media metrics may include a participant metric indicative of a rate of social media mentions related to a participant in the live event, a participant group metric indicative of a rate of social media mentions related to a group of participants in the live event, an event metric indicative of a rate of social media mentions related to the live event, and/or other types of metrics related to social media posts related to the live event. In some embodiments, the social media metrics may be determined based at least in part on social media data obtained from one or more social media platforms. The social media data may be indicative of social media mentions related to a participant in the live event, a group of participants in the live event, the live event itself, and/or other aspects or characteristics of the live event mentioned in the social media posts.

At block 410 of the process flow 400, first global engagement metrics for a first time interval during the time period may be determined. For example, computer-executable instructions of one or more module(s) stored at a highlight determination server may be executed to determine first global engagement metrics for a first time interval during the time period. The first global engagement metrics may be based at least in part on the user interaction metrics and the social media metrics. For example, the first global engagement metrics may include one or more of the user interaction metrics for the first time period and one or more of the social media metrics for the first time period.

At block 412 of the process flow 400, a first quality score for the first time interval may be determined. For example, computer-executable instructions of one or more module(s) stored at a highlight determination server may be executed to determine a first quality score for the first time interval. The first quality score may be indicative of user engagement in a first segment of the media content. The first quality score may be based at least in part on the first global engagement metrics. For example, the first quality score may be determined using one or more machine learning algorithms that receive the first global engagement metrics as input and output the first quality score.

At block 414 of the process flow 400, a first stream start time corresponding to a beginning of the first segment and a first stream end time corresponding to an end of the first segment may be determined. For example, computer-executable instructions of one or more module(s) stored at a highlight determination server may be executed to determine a first stream start time corresponding to a beginning of the first segment and a first stream end time corresponding to an end of the first segment. The first stream start time and the first stream end time may be determined based at least in part on the first time interval and segment-by-segment metadata for the media content. For example, the segment-by-segment metadata may be used to determine that the first time interval corresponds to the first segment, and the segment-by-segment metadata may include the first stream start time and the first stream end time for the first segment.

At block 416 of the process flow 400, a first clip of the first segment may be generated. For example, computer-executable instructions of one or more module(s) stored at a highlight determination server may be executed to generate a first clip of the first segment. The first clip of the first segment may be generated based at least in part on the first stream start time and the first stream end time. For example, the first clip may be generated from the media content by clipping the first segment from the media content, using the first stream start time to identify the beginning of the clip and the first stream end time to identify the end of the clip.

At block 418 of the process flow 400, a highlight replay for the media content may be generated. For example, computer-executable instructions of one or more module(s) stored at a highlight determination server may be executed to generate a highlight replay for the media content. The highlight replay may include the first clip and a second clip of a second segment of the media content. For example, the first clip and the second clip may be selected for inclusion in the highlight replay based on one or more metrics or characteristics associated with the respective clips, and the first clip and the second clip may be combined to form the highlight replay.

At block 420 of the process flow 400, the highlight replay may be caused to be presented at a user device. For example, computer-executable instructions of one or more module(s) stored at a highlight determination server may be executed to cause the highlight replay to be presented at a user device. For example, the highlight replay may be caused to be presented at the user device in response to receiving a request for the highlight replay from the user device.

One or more operations of the methods, process flows, or use cases of FIGS. 1-4 may have been described above as being performed by a user device, or more specifically, by one or more program module(s), applications, or the like executing on a device. It should be appreciated, however, that any of the operations of methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
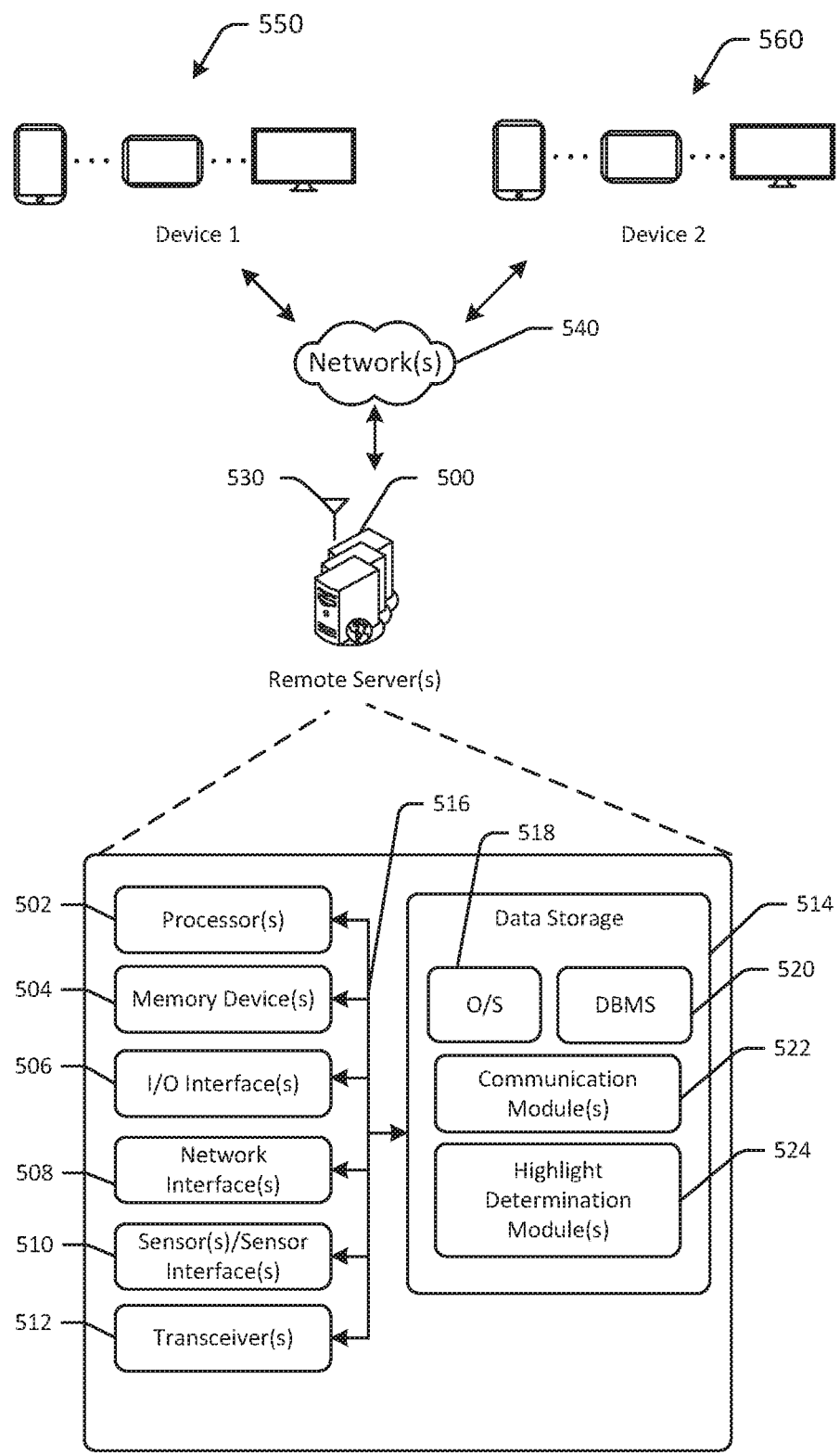
FIG. 5 schematically illustrates an example architecture of a system in accordance with one or more embodiments of the disclosure.

FIG. 5 is a schematic block diagram of one or more illustrative remote server(s) 500 in accordance with one or more example embodiments of the disclosure. The remote server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 500 may correspond to an illustrative device configuration for the highlight determination server(s) of FIGS. 1-4.

The remote server(s) 500 may be configured to communicate via one or more networks with one or more servers, user devices, or the like. The remote server(s) 500 may be configured to deliver or cause delivery of instructions and/or one or more pieces of content and may further be configured to receive media content corresponding to a live event from a media content server, cause the media content to be streamed to a plurality of user devices over a time period, determine user interaction metrics associated with the streamed media content and indicative of user interactions with the plurality of user devices during the time period, determine social media metrics associated with the live event and indicative of social media posts related to the live event and posted during the time period, determine first global engagement metrics for a first time interval during the time period based at least in part on the user interaction metrics and the social media metrics, determine a first quality score for the first time interval based at least in part on the first global engagement metrics, determine a first stream start time corresponding to a beginning of the first segment and a first stream end time corresponding to an end of the first segment based at least in part on the first time interval and segment-by-segment metadata for the media content, generate a first clip of the first segment based at least in part on the first stream start time and the first stream end time, generate a highlight replay for the media content that comprises the first clip and a second clip of a second segment of the media content, and cause the highlight replay to be presented at a user device. In some embodiments, a single remote server or single group of remote servers may be configured to perform more than one type of content delivery functionality.

The remote server(s) 500 may be configured to communicate via one or more networks 540. Such network(s) 540 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 540 may have any suitable communication range associated therewith and may include, for example, global networks (e.g., the Internet), metropolitan area networks (MANs), wide area networks (WANs), local area networks (LANs), or personal area networks (PANs). In addition, such network(s) 540 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In FIG. 5, the remote server(s) 500 may communicate with one or more user devices via the network(s) 540. For example, the remote server(s) 500 may communicate with a first user device 550 via the network(s) 540 when the first user device 550 is connected to the network(s) 540. Likewise, the remote server(s) 500 may communicate with a second user device 560 via the network(s) 540 when the second user device 560 is connected to the network(s) 540.

The remote server(s) 500 may communicate with any number of semi-connected devices.

In an illustrative configuration, the remote server(s) 500 may include one or more processors (processor(s)) 502, one or more memory devices 504 (also referred to herein as memory 504), one or more input/output ("I/O") interface(s) 506, one or more network interface(s) 508, one or more sensors or sensor interface(s) 510, one or more transceivers 512, and data storage 514. The remote server(s) 500 may further include one or more buses 516 that functionally couple various components of the remote server(s) 500. The remote server(s) 500 may further include one or more antenna(e) 530 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 516 may include at least one of a system bus, a memory bus, an address bus, or a message bus, and may permit the exchange of information (e.g., data (including computer-executable code), signaling, etc.) between various components of the remote server(s) 500. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 504 of the remote server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 504 and the data storage 514, removable and/or non-removable, are examples of computer-readable storage media (CRSM) as that term is used herein.

The data storage 514 may store computer-executable code, instructions, or the like that may be loadable into the memory 504 and executable by the processor(s) 502 to cause the processor(s) 502 to perform or initiate various operations. The data storage 514 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to data storage 514 for non-volatile storage.

More specifically, the data storage 514 may store one or more operating systems (O/S) 518; one or more database management systems (DBMS) 520; and one or more program module(s), applications, engines, computer-executable code, scripts, or the like such as, for example, one or more communication module(s) 522, and/or one or more highlight determination module(s) 524. Some or all of these module(s) may be or include sub-module(s). Any of the components depicted as being stored in data storage 514 may include any combination of software, firmware, and/or hardware. The software and/or firmware may include computer-executable code, instructions, or the like that may be loaded into the memory 504 for execution by one or more of the processor(s) 502. Any of the components depicted as being stored in data storage 514 may support the functionality described in reference to the corresponding components named earlier in this disclosure.

The data storage 514 may further store various types of data utilized by the components of the remote server(s) 500. Any data stored in the data storage 514 may be loaded into the memory 504 for use by the processor(s) 502 in executing computer-executable code. In addition, any data depicted as being stored in the data storage 514 may potentially be stored in one or more datastore(s) and may be accessed via the DBMS 520 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, product catalog information, transaction history information, product cost information, one or more expected performance models, one or more expected cost models, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the remote server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the communication module(s) 522 may include computer-executable instructions, code, or the like that responsive to execution by one or more of the processor(s) 502 may perform functions including, but not limited to, communicating with remote servers, communicating with remote datastores, communicating with user devices, sending or receiving information and instructions, and the like.

The one or more highlight determination module(s) 524 may include computer-executable instructions, code, or the like that responsive to execution by one or more of the processor(s) 502 may perform functions including, but not limited to, the functions described above with respect to the highlight determination modules 152.

Referring now to other illustrative components depicted as being stored in the data storage 514, the O/S 518 may be loaded from the data storage 514 into the memory 504 and may provide an interface between other application software executing on the remote server(s) 500 and the hardware resources of the remote server(s) 500. More specifically, the O/S 518 may include a set of computer-executable instructions for managing the hardware resources of the remote server(s) 500 and for providing common services to other application programs (e.g., managing memory allocation among various application programs). In certain example embodiments, the O/S 518 may control execution of the other program module(s) to dynamically enhance characters for content rendering. The O/S 518 may include any operating system now known or which may be developed in the future including, but not limited to, any server operating system, any mainframe operating system, or any other proprietary or non-proprietary operating system.

The DBMS 520 may be loaded into the memory 504 and may support functionality for accessing, retrieving, storing, and/or manipulating data stored in the memory 504 and/or data stored in the data storage 514. The DBMS 520 may use any of a variety of database models (e.g., relational model, object model, etc.) and may support any of a variety of query languages. The DBMS 520 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 500 is a mobile device, the DBMS 520 may be any suitable light-weight DBMS optimized for performance on a mobile device.

Referring now to other illustrative components of the remote server(s) 500, the input/output (I/O) interface(s) 506 may facilitate the receipt of input information by the remote server(s) 500 from one or more I/O devices as well as the output of information from the remote server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 530 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 500 may further include one or more network interface(s) 508 via which the remote server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 530 may include any suitable type of antenna depending, for example, on the communications protocols used to transmit or receive signals via the antenna (e) 530. Non-limiting examples of suitable antennae may include directional antennae, non-directional antennae, dipole antennae, folded dipole antennae, patch antennae, multiple-input multiple-output (MIMO) antennae, or the like. The antenna(e) 530 may be communicatively coupled to one or more transceivers 512 or radio components to which or from which signals may be transmitted or received.

As previously described, the antenna(e) 530 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 530 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 530 may be configured to transmit or receive radio frequency signals within any suitable frequency range forming part of the unlicensed portion of the radio spectrum.

The antenna(e) 530 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 530—transmitting or receiving radio frequency (RF) signals in the bandwidth and/or channels corresponding to the communications protocols utilized by the remote server(s) 500 to communicate with other devices. The transceiver(s) 512 may include hardware, software, and/or firmware for modulating, transmitting, or receiving—potentially in cooperation with any of antenna(e) 530—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the remote server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 5 as being stored in the data storage 514 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 500, and/or hosted on other computing device(s) accessible via one or more networks, may be provided to support the functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the remote server(s) 500 may include alternate and/or additional hardware, software, or firmware components beyond those described or depicted without departing from the scope of the disclosure. More particularly, it should be appreciated that software, firmware, or hardware components depicted as forming part of the remote server(s) 500 are merely illustrative and that some components may not be present or additional components may be provided in various embodiments. While various illustrative program module(s) have been depicted and described as software module(s) stored in the data storage 514, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms that may be used interchangeably herein.

That which is claimed is:

1. A method comprising:
    determining, by one or more computer processors coupled to at least one memory, media content streamed to a plurality of user devices over a time period, the media content corresponding to a live event;
    determining user interaction data associated with the streamed media content, the user interaction data indicative of user interactions with the plurality of user devices during the time period;
    determining, based at least in part on the user interaction data, a first quality score for a first time interval during the time period, the first quality score indicative of user engagement in a first segment of the media content;
    determining, based at least in part on the first time interval and segment-by-segment metadata for the media content, a first stream start time corresponding to a beginning of the first segment and a first stream end time corresponding to an end of the first segment;
    generating, based at least in part on the first stream start time and the first stream end time, a first clip of the first segment; and
    determining, based at least in part on the first quality score, that the first clip is to be included in highlight content for the media content;
    wherein the segment-by-segment metadata comprises first segment metadata associated with the first segment, the first segment metadata comprising: (i) first event action metadata indicative of one or more first actions that occurred in a first portion of the live event corresponding to the first segment, (ii) first participant metadata indicative of one or more participants in the live event related to the one or more first actions, (iii) first event start time metadata corresponding to a beginning of the first portion, and (iv) first event end time metadata corresponding to an end of the first portion.

2. The method of claim 1, further comprising:
determining, based at least in part on the user interaction data, one or more user interaction metrics associated with the first segment, the one or more user interaction metrics comprising at least one of: (i) a rewind metric indicative of user selection of a rewind function, (ii) a skip-back metric indicative of user selection of a skip-back function, and (iii) a volume-up metric indicative of user selection of a volume-up function.

3. The method of claim 1, wherein determining, based at least in part on the first time interval and the segment-by-segment metadata, the first stream start time and the first stream end time comprises determining the first stream start time and the first stream end time based at least in part on the first time interval, the first event start time, and the first event end time.

4. The method of claim 1, further comprising:
generating one or more first tags for the first segment, the one or more first tags comprising at least one of: (i) the first quality score, (ii) the first event action metadata, and (iii) the first participant metadata; and
storing the first clip in association with the one or more first tags.

5. The method of claim 1, wherein the segment-by-segment metadata further comprises second segment metadata associated with a second segment of the media content, the second segment metadata comprising second event action metadata indicative of one or more second actions that occurred in a second portion of the live event corresponding to the second segment, the method further comprising:
generating a second clip of the second segment; and
determining, based at least in part on the one or more second actions, that the second clip is to be included in the highlight content.

6. The method of claim 1, further comprising:
determining social media data associated with the live event, the social media data indicative of social media posts related to the live event and posted during the time period;
wherein determining, based at least in part on the user interaction data, the first quality score comprises determining the first quality score based at least in part on the user interaction data and the social media data.

7. The method of claim 6, further comprising:
determining, based at least in part on the social media data, one or more social media metrics associated with the first time interval, the one or more social media metrics comprising at least one of: (i) a participant metric indicative of social media mentions related to a participant in the live event, (ii) a participant group metric indicative of social media mentions related to a group of participants in the live event, and (iii) an event metric indicative of social media mentions related to the live event.

8. The method of claim 6, further comprising:
generating, prior to the live event and based at least in part on event metadata, a social media filter, the event metadata comprising participant metadata indicative of one or more participants in the live event;
determining a plurality of social media posts posted during the time period; and
determining, based at least in part on the social media filter and the plurality of social media posts, the social media posts related to the live event.

9. The method of claim 1, further comprising:
generating the highlight content for the media content, the highlight content comprising the first clip and a second clip of a second segment of the media content; and
storing the highlight content in association with one or more tags related to the first clip and the second clip.

10. The method of claim 1, further comprising:
receiving a request for the highlight content from a user device, the request indicative of at least one of: (i) a duration of the highlight content, (ii) one or more types of actions that occurred in the live event, and (iii) one or more participants in the live event;
generating the highlight content based at least in part on the request; and
causing the highlight content to be presented at the user device.

11. The method of claim 1, further comprising:
generating, after the time period, the highlight content for the media content, the highlight content comprising the first clip and a second clip of a second segment of the media content;
receiving, after the time period, a request for the highlight content from a user device; and
causing, after the time period, the highlight content to be presented at the user device.

12. The method of claim 1, further comprising:
generating, during the time period, the highlight content for the media content, the highlight content comprising the first clip and a second clip of a second segment of the media content;
receiving, during the time period, a request for the highlight content from a user device; and
causing, during the time period, the highlight content to be presented at the user device.

13. A device comprising:
at least one memory that stores computer-executable instructions; and
at least one processor configured to access the at least one memory and execute the computer-executable instructions to:
determine media content streamed to a plurality of user devices over a time period, the media content corresponding to a live event;
determine social media data associated with the live event, the social media data indicative of social media posts related to the live event and posted during the time period;
generate, prior to the live event and based at least in part on event metadata, a social media filter, the event metadata comprising participant metadata indicative of one or more participants in the live event;
determine a plurality of social media posts posted during the time period;
determine, based at least in part on the social media filter and the plurality of social media posts, the social media posts related to the live event;
determine user interaction data associated with the streamed media content, the user interaction data indicative of user interactions with the plurality of user devices during the time period;

determine, based at least in part on the user interaction data and the social media data, a first quality score for a first time interval during the time period, the first quality score indicative of user engagement in a first segment of the media content;

determine, based at least in part on the first time interval and segment-by-segment metadata for the media content, a first stream start time corresponding to a beginning of the first segment and a first stream end time corresponding to an end of the first segment;

generate, based at least in part on the first stream start time and the first stream end time, a first clip of the first segment; and determine, based at least in part on the first quality score, that the first clip is to be included in highlight content for the media content.

14. The device of claim 13, wherein the at least one processor is further configured to access the at least one memory and execute the computer-executable instructions to:

determine social media data associated with the live event, the social media data indicative of social media posts related to the live event and posted during the time period; and determine the first quality score based at least in part on the user interaction data and the social media data.

15. The device of claim 14, wherein the at least one processor is further configured to access the at least one memory and execute the computer-executable instructions to:

determine, prior to the live event and based at least in part on event metadata, a social media filter, the event metadata comprising participant metadata indicative of one or more participants in the live event;

determine a plurality of social media posts posted during the time period; and determine, based at least in part on the social media filter and the plurality of social media posts, the social media posts related to the live event.

16. A method comprising:

determining, by one or more computer processors coupled to memory, media content streamed to a plurality of user devices over a time period, the media content corresponding to a live event;

determining user interaction data associated with the streamed media content;

determining, based at least in part on the user interaction data, a first quality score for a first time interval during the time period, the first quality score indicative of user engagement in a first segment of the media content;

determining segment-by-segment metadata for the media content, the segment-by-segment metadata comprising first segment metadata for the first segment, wherein the first segment metadata comprises: (i) first event action metadata indicative of one or more first actions that occurred in a first portion of the live event corresponding to the first segment, (ii) first participant metadata indicative of one or more participants in the live event related to the one or more first actions, (iii) first event start time metadata, and (iv) first event end time metadata;

determining, based at least in part on the first time interval and the first segment metadata, a first stream start time corresponding to a beginning of the first segment and a first stream end time corresponding to an end of the first segment;

generating, based at least in part on the first stream start time and the first stream end time, a first clip of the first segment; and determining, based at least in part on the first quality score, that the first clip is to be included in highlight content for the media content.

17. The method of claim 16, further comprising:

generating the highlight content for the media content, the highlight content comprising the first clip and a second clip of a second segment of the media content; and storing the highlight content in association with one or more tags related to the first clip and the second clip.

18. The method of claim 16, further comprising:

generating one or more first tags for the first segment, the one or more first tags comprising at least one of: (i) the first quality score, (ii) the first event action metadata, and (iii) the first participant metadata; and storing the first clip in association with the one or more first tags.

19. The method of claim 16, further comprising:

receiving a request for the highlight content from a user device, the request indicative of at least one of: (i) a duration of the highlight content, (ii) one or more types of actions that occurred in the live event, and (iii) one or more participants in the live event;

generating the highlight content based at least in part on the request; and causing the highlight content to be presented at the user device.

20. The method of claim 16, further comprising:

generating, after the time period, the highlight content for the media content, the highlight content comprising the first clip and a second clip of a second segment of the media content;

receiving, after the time period, a request for the highlight content from a user device; and causing, after the time period, the highlight content to be presented at the user device.

* * * * *